US009850397B2

(12) United States Patent
Kang et al.

(10) Patent No.: US 9,850,397 B2
(45) Date of Patent: *Dec. 26, 2017

(54) PLASTIC FILM

(71) Applicant: LG CHEM, LTD., Seoul (KR)

(72) Inventors: Joon Koo Kang, Daejeon (KR); Yeong Rae Chang, Daejeon (KR); Sung Don Hong, Daejeon (KR); Heon Kim, Daejeon (KR); Hye Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 136 days.

This patent is subject to a terminal disclaimer.

(21) Appl. No.: 14/777,038

(22) PCT Filed: Mar. 13, 2014

(86) PCT No.: PCT/KR2014/002125
§ 371 (c)(1),
(2) Date: Sep. 15, 2015

(87) PCT Pub. No.: WO2014/142581
PCT Pub. Date: Sep. 18, 2014

(65) Prior Publication Data
US 2016/0032137 A1 Feb. 4, 2016

(30) Foreign Application Priority Data

Mar. 15, 2013 (KR) ......................... 10-2013-0028138
Mar. 15, 2013 (KR) ......................... 10-2013-0028139
Mar. 12, 2014 (KR) ......................... 10-2014-0029030

(51) Int. Cl.
C08J 3/24 (2006.01)
C08J 7/04 (2006.01)
C08K 3/36 (2006.01)
C09D 7/12 (2006.01)
C09D 135/02 (2006.01)

(52) U.S. Cl.
CPC .............. C09D 135/02 (2013.01); C08J 3/24 (2013.01); C08J 3/243 (2013.01); C08J 7/04 (2013.01); C08J 7/047 (2013.01); C08K 3/36 (2013.01); C09D 7/12 (2013.01); C08J 2400/208 (2013.01); C08J 2400/21 (2013.01); C08J 2400/24 (2013.01); C08J 2433/04 (2013.01); C08J 2451/00 (2013.01)

(58) Field of Classification Search
CPC .. C09D 135/02; C09D 7/12; C08J 7/04; C08J 7/047; C08J 3/24; C08J 3/243; C08J 2400/24; C08J 2451/00; C08J 2433/04; C08J 2400/208; C08J 2400/21; C08K 3/36

See application file for complete search history.

(56) References Cited

U.S. PATENT DOCUMENTS

| 6,228,499 | B1 | 5/2001 | Nakauchi et al. | |
|---|---|---|---|---|
| 9,529,122 | B2* | 12/2016 | Kang | G02B 5/30 |
| 2009/0042034 | A1 | 2/2009 | Ito et al. | |
| 2009/0213462 | A1 | 8/2009 | Wakizaka et al. | |
| 2009/0214871 | A1 | 8/2009 | Fukuda et al. | |
| 2013/0261209 | A1* | 10/2013 | Kim | C08G 18/672 522/33 |
| 2015/0166818 | A1* | 6/2015 | Kang | C09D 133/14 428/213 |
| 2015/0197662 | A1* | 7/2015 | Kang | C08L 51/08 428/209 |
| 2015/0203711 | A1* | 7/2015 | Kang | C08J 5/18 428/209 |
| 2015/0225598 | A1* | 8/2015 | Kang | C08L 33/04 428/209 |
| 2015/0234097 | A1* | 8/2015 | Kang | G02B 1/14 359/483.01 |
| 2015/0252210 | A1* | 9/2015 | Kang | C09D 105/16 428/217 |
| 2015/0252212 | A1* | 9/2015 | Kang | C09D 135/02 428/209 |
| 2015/0299507 | A1* | 10/2015 | Kang | C08L 33/04 428/78 |
| 2016/0024330 | A1* | 1/2016 | Jung | C09D 133/04 428/313.9 |
| 2016/0282902 | A1* | 9/2016 | Kang | B32B 27/00 |
| 2016/0297178 | A1* | 10/2016 | Kang | B32B 27/06 |

FOREIGN PATENT DOCUMENTS

| CN | 102105515 A | 6/2011 |
|---|---|---|
| CN | 102317384 A | 1/2012 |
| CN | 102781986 A | 11/2012 |
| EP | 2 840 107 A1 | 2/2015 |
| EP | 2 843 008 A1 | 3/2015 |
| EP | 2 857 440 A1 | 4/2015 |
| EP | 2 865 707 A1 | 4/2015 |
| EP | 2 873 692 A1 | 5/2015 |
| JP | 2897078 B2 | 3/1993 |
| JP | 2004-035599 A | 2/2004 |
| JP | 2008-197662 A | 8/2008 |
| JP | 2009-204725 A | 9/2009 |
| JP | 2010-53231 A | 3/2010 |
| JP | 2010-121013 A | 6/2010 |

(Continued)

OTHER PUBLICATIONS

Extended European Search Report issued for European Patent Application No. 14763678.1 date Sep. 22, 2016, 9 pages.

(Continued)

Primary Examiner — Patrick Niland
(74) Attorney, Agent, or Firm — Rothwell, Figg, Ernst & Manbeck, P.C.

(57) ABSTRACT

The present invention relates to a plastic film. More particularly, the present invention relates to a plastic film which exhibits high hardness, self-healing property and excellent processability. The plastic film of the present invention exhibits high hardness, self-healing property, scratch resistance, high transparency, durability, light resistance, light transmittance or the like, and thus can be applied to various fields.

17 Claims, No Drawings

(56) References Cited

FOREIGN PATENT DOCUMENTS

| | | |
|---|---|---|
| JP | 2010-280832 A | 12/2010 |
| JP | 2011-74135 A | 4/2011 |
| JP | 2012-030532 A | 2/2012 |
| JP | 4911474 B2 | 4/2012 |
| JP | 2012-180487 A | 9/2012 |
| KR | 10-2007-0096329 A | 10/2007 |
| KR | 10-2008-0055698 A | 6/2008 |
| KR | 10-0916171 B1 | 9/2009 |
| KR | 10-2010-0028648 A | 3/2010 |
| KR | 10-2010-0041992 A | 4/2010 |
| KR | 10-2011-0119704 A | 11/2011 |
| KR | 10-1127952 B1 | 3/2012 |
| KR | 10-2012-0093088 A | 8/2012 |
| WO | 2007/142142 A1 | 12/2007 |
| WO | 2012/111947 A2 | 8/2012 |

OTHER PUBLICATIONS

International Search Report issued in International Application No. PCT/KR2014/002125 dated Jun. 26, 2014, 2 pages.

\* cited by examiner

PLASTIC FILM

CROSS REFERENCE TO RELATED APPLICATIONS

This application is a 35 U.S.C. §371 National Phase Entry Application from PCT/KR2014/002125, filed Mar. 13, 2014, and designating the United States, which claims priority under 35 U.S.C. §119 to Korean Patent Application No. 10-2013-0028138 filed on Mar. 15, 2013, to Korean Patent Application No. 10-2013-0028139 filed on Mar. 15, 2013, and to Korean Patent Application No. 10-2014-0029030 filed on Mar. 12, 2014, which are incorporated herein by reference in their entireties.

BACKGROUND OF THE INVENTION (a) Field of the Invention

The present invention relates to a plastic film. More particularly, the present invention relates to a plastic film which exhibits high hardness, impact resistance, self-healing property and excellent processability.

This application claims the benefit of Korean Patent Application No. 10-2013-0028138, filed on Mar. 15, 2013, Korean Patent Application No. 10-2013-0028139, filed on Mar. 15, 2013, and Korean Patent Application No. 10-2014-0029030, filed on Mar. 12, 2014, which are all hereby incorporated by reference in their entireties into this application.

(b) Description of the Related Art

With the advance of mobile appliances such as smart phones, tablet PCs or the like, substrates for displays have recently been required to become lighter and slimmer. Display windows or front panels of such mobile appliances are generally made of glass or reinforced glass both of which have excellent mechanical properties. However, glass suffers from the disadvantage that its own weight makes mobile appliances heavy and it is easily broken by an external impact.

As an alternative to glass, plastic resins have been studied. The plastic resin films are light in weight and resistant to impact, and thus are consistent with the trend of pursuing lighter mobile appliances. Particularly, to achieve a film with properties of high hardness and wear resistance, it is proposed to utilize a film in which a support substrate is coated with a coating layer.

Increasing the thickness of the coating layer is considered as an approach to improving the surface hardness thereof. The coating layer should be of a predetermined thickness to ensure the surface hardness sufficient as the alternative to glass. However, as the coating layer increases in thickness, the surface hardness thereof may become higher, but the coating layer is more prone to setting shrinkage which leads to wrinkling or curling with the concomitant production of cracks or exfoliations, and thus the coating layers are difficult to employ in practice.

Recently, some methods have been proposed for conferring a high hardness on hard coating films, without the problems of cracking and setting shrinkage-induced curling.

Korean Patent Publication No. 2010-0041992 discloses a plastic film composition, free of monomers, including a binder resin based on ultraviolet-curable polyurethane acrylate-based oligomers. However, this plastic film has a pencil hardness of about 3H, and thus the strength thereof is not sufficient to be a substitute for glass panels for displays.

Meanwhile, studies on coating materials having self-healing capability are actively progressing because they do not require an additional coating or repair process even when the surface is damaged, and are extremely favorable for appearance and performance maintenance of products. As a result of these studies, compositions containing UV curable compositions using self-healing oligomers have been suggested, but coating materials obtained from the compositions have problems of insufficient surface hardness and self-healing capability.

SUMMARY OF THE INVENTION

In order to solve the above problems, the present invention provides a plastic film which exhibits high hardness, scratch resistance and excellent mechanical properties, and also excellent processability and self-healing property, without the problems of curling, warping or cracking.

In order to solve the above problems, the present invention provides a plastic film, including:

a support substrate; and a coating layer formed on at least one side of the support substrate, including a crosslinked copolymer, in which a tri- to hexafunctional acrylate-based monomer and a caprolactone group-containing multifunctional acrylate-based compound are copolymerized at a weight ratio of 5:5 to 8:2, and an inorganic fine particle dispersed in the crosslinked copolymer.

The plastic film of the present invention exhibits high hardness, impact resistance, self-healing property, scratch resistance, and high transparency, and is superior in terms of processability to be less prone to curling or cracking. The plastic film can be usefully applied to mobile appliances, display instruments, and front panels and display windows of various instruments as an alternative to a cover plate made of glass or reinforced glass.

DETAILED DESCRIPTION OF THE EMBODIMENTS

The plastic film of the present invention includes a support substrate; and a coating layer formed on at least one side of the support substrate, including a crosslinked copolymer, in which a tri- to hexafunctional acrylate-based monomer and a caprolactone group-containing multifunctional acrylate-based compound are copolymerized at a weight ratio of 5:5 to 8:2, and an inorganic fine particle dispersed in the crosslinked copolymer.

As used herein, the term "first", "second", etc. is employed only to describe various elements, and is intended to discriminate one element from another.

All of the terms used in the specification are taken only to illustrate embodiments, and are not intended to limit the present invention. The singular forms include plural references unless the context clearly dictates otherwise. It is to be noticed that the term "include", "including", "having", etc., as used herein, is to be interpreted as specifying the presence of the stated features, steps, components, or combinations thereof, but does not preclude the presence or addition of one or more other features, steps, components, or combinations thereof.

Additionally, the word "on" or "above", as used in the context of formation of one element, means pertaining to the direct formation of one element on another element or the additional formation of one element between layers or on a subject or substrate.

The present invention may be modified in various ways and include several embodiments. Specific embodiments are illustrated and described in detail below. The present invention, however, should not be construed as limited to the exemplary embodiments set forth herein but may include any modifications, equivalents or alternatives within the spirit and scope of the present invention.

Hereinafter, the plastic film of the present invention will be described in more detail.

According to one aspect, the present invention provides a plastic film including a support substrate; and a coating layer formed on at least one side of the support substrate, the coating layer including a crosslinked copolymer, in which a tri- to hexafunctional acrylate-based monomer and a caprolactone group-containing multifunctional acrylate-based compound are copolymerized at a weight ratio of 5:5 to 8:2, and an inorganic fine particle dispersed in the crosslinked copolymer.

In the plastic film of the present invention, any typical plastic resin, whether capable of being stretched or not, may be used for the support substrate on which the coating layer is formed, without particular limitations in the preparation method or the material thereof, so long as it is transparent. More specifically, according to one embodiment of the present invention, the support substrate may be a film including, for example, polyester such as polyethyleneterephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), MMA (methyl methacrylate), a fluoro-polymer or the like. The support substrate may be a single layer structure, or if necessary, may be a multilayer structure including two or more substrates composed of the same or different materials, but is not particularly limited thereto.

According to one embodiment of the present invention, the support substrate may be a multilayered substrate made of polyethyleneterephthalate (PET) or a multilayered substrate made of co-extruded polymethylmethacrylate (PMMA)/polycarbonate (PC).

Further, according to one embodiment of the present invention, the support substrate may be a substrate including a copolymer of polymethylmethacrylate (PMMA) and polycarbonate (PC).

The thickness of the support substrate is not particularly limited, but the support substrate having a thickness of approximately 30 to approximately 1,200 μm, or approximately 50 to approximately 800 μm may be used.

The plastic film of the present invention includes a coating layer which is formed on at least one side of the support substrate.

The coating layer includes a crosslinked copolymer, in which a tri- to hexafunctional acrylate-based monomer and a caprolactone group-containing multifunctional acrylate-based compound are copolymerized at a weight ratio of 5:5 to 8:2, and an inorganic fine particle dispersed in the crosslinked copolymer.

The term "acrylate-based," throughout the present specification, is intended to encompass acrylate, methacrylate, and derivatives thereof introduced with various substituents.

The tri- to hexafunctional acrylate-based monomer may be trimethylolpropane triacrylate (TMPTA), trimethylolpropane ethoxy triacrylate (TMPEOTA), glycerin-propoxylated triacrylate (GPTA), pentaerythritol tetraacrylate (PETA), dipentaerythritol hexaacrylate (DPHA) or the like. These tri- to hexafunctional acrylate-based monomers may be used alone or in combination of different types thereof.

As used herein, the term "caprolactone group-containing multifunctional acrylate-based compound" means a monomer compound, an oligomer or a polymer material, which includes a di- or multifunctional acrylate group crosslinkable with the tri- to hexafunctional acrylate-based monomer and also includes caprolactone or a repeating unit derived therefrom in the molecule.

The crosslinked copolymer of the caprolactone group-containing multifunctional acrylate-based compound is able to exhibit excellent physical properties such as flexibility, elasticity, impact resistance, durability or the like, and also self-healing capability against an external impact. Therefore, the plastic film including the crosslinked copolymer which is prepared by crosslinking polymerization of the caprolactone group-containing multifunctional acrylate-based compound and the tri- to hexafunctional acrylate-based monomer secures mechanical properties such as high scratch resistance, high hardness, wear resistance or the like, and also high elasticity or elastic recovery, and achieves excellent self-healing capability against scratch or external damage, with minimal curling or cracking occurrence.

As used herein, the term "self-healing" means a property of recovering the original condition within a predetermined time, without an additional coating or repair process even when the surface of the coating layer is damaged by scratch, etc., and it can be evaluated by measuring a time to recover from a scratch after rubbing the surface of the coating layer with a copper brush, when observed with the naked eye.

According to one embodiment of the present invention, the caprolactone group-containing multifunctional acrylate-based compound may include, for example, a polycaprolactone acrylate-based polymer or polyrotaxane.

Generally, polyrotaxane means a structurally interlocked compound consisting of a dumbbell shaped molecule and a macrocycle, in which the dumbbell shaped molecule includes a certain linear molecule and blocking groups arranged at both ends of the linear molecule, the linear molecule penetrates the inside of the macrocycle, and the macrocycle may move along the linear molecule and be prevented from escaping by the blocking groups.

According to one embodiment of the present invention, the polyrotaxane is characterized in that a caprolactone compound or a repeating unit compound derived therefrom binds to the macrocycle, and an acrylate-based compound binds to the end of the caprolactone compound.

Specifically, the acrylate-based compound may directly bond to the end of the caprolactone compound, or may bind via a urethane bond (—NH—CO—O—), an ether bond (—O—), a thioester bond (—S—CO—O—), or an ester bond (—CO—O—). The type of the functional group that mediates a bond between the acrylate-based compound and the caprolactone compound may be determined according to the type of the functional groups respectively substituted in the acrylate-based compound and the caprolactone compound, or the type of the compound used in the reaction of the acrylate-based compound and the caprolactone compound.

For example, if an acrylate-based compound including one or more of an isocyanate group, a carboxyl group, a hydroxyl group, a thioate group, or a halogen group is reacted with a macrocycle to which a caprolactone compound binds, a direct bond, a urethane bond (—NH—CO—O—), an ether bond (—O—), a thioester bond (—S—CO—O—), or an ester bond (—CO—O—) may be formed. Further, if a reaction product of the caprolactone-bonded macrocycle with a compound including two or more of an isocyanate group, a carboxyl group, a hydroxyl group, a thioate group, or a halogen group is reacted with an acrylate-based compound including one or more of a hydroxyl group or a carboxyl group, one or more of a urethane bond (—NH—CO—O—), an ether bond (—O—), a thioester bond (—S—CO—O—), or an ester bond (—CO—O—) may be formed.

The acrylate-based compound may be a (meth)acryloylakyl compound, a (meth)acryloylcycloakyl compound or a (meth)acryloylaryl compound, to which one or more of an isocyanate group, a carboxyl group, a thioate group, a hydroxyl group, or a halogen group bind at the end.

Herein, a C1-12 linear or branched alkylene group may be included in the (meth)acryloyl alkyl compound, a C4-20 cycloalkylene group may be included in the (meth)acryloyl cycloalkyl compound, and a C6-20 arylene group may be included in the (meth)acryloyl aryl compound.

The macrocycle may include any macrocycle without particular limitations as long as it has a sufficient size to penetrate or surround the linear molecule, and it may include a functional group such as a hydroxyl group, an amino group, a carboxyl group, a thiol group, or an aldehyde group that may react with other polymers or compounds. Specific examples of the macrocycle may include α-cyclodextrin, β-cyclodextrin, γ-cyclodextrin, or a mixture thereof.

The caprolactone compound binding to the macrocycle may directly bind to the macrocycle, or may bind thereto via a C1-10 linear or branched oxyalkylene group. The functional group that mediates the bond may be determined according to the type of the functional group substituted in the macrocycle or the caprolactone compound, or the type of the compound used in the reaction of the macrocycle and the caprolactone compound.

Meanwhile, the liner molecule may be any compound without limitations as long as it has a molecular weight over certain level and has a linear shape, but a polyalkylene-based compound or a polycaprolactone group is preferably used. Specifically, a polyoxyalkylene-based compound having a C1-8 oxyalkylene repeating unit or a polycaprolactone group having a C3-10 lactone-based repeating unit may be used.

Further, the linear molecule may have a weight average molecular weight of approximately 1,000 to approximately 50,000 g/mol. If the weight average molecular weight of the linear molecule is too low, a coating layer prepared using the same may not have sufficient mechanical properties or self-healing capability, and if the weight average molecular weight is too high, compatibility of the prepared coating layer may be lowered or the appearance or uniformity of the material may be significantly lowered.

Meanwhile, the blocking group may be appropriately controlled according to the property of the prepared polyrotaxane compound, and for example, one or two or more selected from the group consisting of dinitrophenyl, cyclodextrin, adamantane, trityl, fluorescein, and pyrene groups may be used.

The polyrotaxane compound having the above structure may have a weight average molecular weight of approximately 100,000 to approximately 800,000 g/mol, approximately 200,000 to approximately 700,000 g/mol, and approximately 350,000 to approximately 650,000 g/mol. If the weight average molecular weight of the polyrotaxane compound is too low, a coating layer prepared therefrom may not have sufficient mechanical properties or self-healing capability, and if the weight average molecular weight is too high, the appearance or uniformity of the layer may be significantly lowered.

Further, since the acrylate-based compound may be introduced at the end of the macrocycle, the polyrotaxane compound may have a relatively low OH value. That is, if only a caprolactone group binds to the macrocycle, multiple hydroxyl (—OH) groups may exist in the polyrotaxane molecule, but as the acrylate-based compound is introduced at the end of the caprolactone group, the OH value of the polyrotaxane compound may be lowered.

According to the plastic film of the present invention, the coating layer includes a crosslinked copolymer which is formed by crosslinking the caprolactone group-containing multifunctional acrylate-based compound with the tri- to hexafunctional acrylate-based monomer at a predetermined weight ratio. Therefore, the coating layer is provided with high hardness and self-healing capability, and secures excellent scratch resistance and impact resistance by preventing damage due to an external impact.

The crosslinked copolymer is a crosslinked copolymer which is formed by copolymerizing the tri- to hexafunctional acrylate-based monomer and the caprolactone group-containing multifunctional acrylate-based compound at a weight ratio of approximately 5:5 to approximately 8:2, or approximately 6:4 to approximately 8:2, or approximately 7:3 to approximately 8:2. If the content of the caprolactone group-containing multifunctional acrylate-based compound is too low beyond the above range, it is difficult to achieve the self-healing effect. If the content of the caprolactone group-containing multifunctional acrylate-based compound is too high, hardness of the coating layer may be lowered. Therefore, the crosslinked copolymer, which is formed by copolymerizing the tri- to hexafunctional acrylate-based monomer and the caprolactone group-containing multifunctional acrylate-based compound at the above weight ratio, is included to achieve impact resistance, scratch resistance, high hardness and the desired level of self-healing capability.

In the plastic film of the present invention, the coating layer includes the inorganic fine particles dispersed in the crosslinked copolymer.

According to one embodiment of the present invention, the inorganic fine particles may be an inorganic fine particle having a diameter in the nanoscale. For example, they may have a diameter of approximately 100 nm or less, or approximately 10 to 100 nm, or approximately 10 to 50 nm. As the inorganic fine particles, for example, silica particles, aluminum oxide particles, titanium oxide particles, or zinc oxide particles may be employed.

The inorganic fine particles are included to further reinforce the hardness of the plastic film.

According to one embodiment of the present invention, the coating layer may include approximately 50 to approximately 90 parts by weight of the crosslinked copolymer and approximately 10 to approximately 50 parts by weight of the inorganic fine particle, or approximately 60 to approximately 80 parts by weight of the crosslinked copolymer and approximately 20 to approximately 40 parts by weight of the inorganic fine particle, when the total weight of the coating layer is regarded as 100 parts by weight. When the crosslinked copolymer and the inorganic fine particle are included in the above range, a plastic film with excellent physical properties can be formed.

According to one embodiment of the present invention, the coating layer may further include a thermosetting resin.

Herein, the "thermosetting resin" means a thermosetting product formed by thermosetting the components of the thermosetting prepolymer composition including oligomers or polymers having functional groups which are able to undergo crosslinking by thermosetting.

According to one embodiment of the present invention, the thermosetting prepolymer composition may include a polyester-based polyurethane oligomer, a polyol, and a polyisocyanate. More specifically, the thermosetting prepolymer composition may contain approximately 10 to approximately 40% by weight of the polyester-based polyurethane oligomer, approximately 5 to approximately 30% by weight of the polyol, and approximately 50 to approximately 80% by weight of the polyisocyanate, based on the total weight of the solid components thereof.

According to one embodiment of the present invention, the polyester-based polyurethane oligomer may be those having the physical properties of a number average molecular weight of approximately 1,000 to approximately 100,000 g/mol, a viscosity of approximately 100 to approximately 3,000 cps when dissolved at a concentration of 15% in cyclohexane, and Tg of −30 to 40° C. The polyester-based polyurethane oligomers with such physical properties may be directly synthesized or may be commercially purchased. The commercially available products may be exemplified by ESTANE® 5701 TPU, ESTANE® 5703 TPU, ESTANE® 5707 TPU, ESTANE® 5708 TPU, ESTANE® 5713 TPU, ESTANE® 5714 TPU, ESTANE® 5715 TPU, ESTANE® 5719 TPU, or ESTANE® 5778 TPU, all from Noveon.

According to one embodiment of the present invention, the polyol may have a number average molecular weight of approximately 1,000 to approximately 100,000 g/mol. In addition, the type of the polyol is not particularly limited, but may be preferably one or more selected from the group consisting of polyethylene glycol polyol, polycarprolactone polyol, polyester polyol, polyether polyol, polyacryl polyol, and polycarbonate polyoldiol. Preferably, more specific examples of the polyol include 1,4-butanediol, diethylene glycol, dipropylene glycol, polyalkylene glycol having an alkyl of 1 to 5 carbon atoms, and polyalkylene ether polyol. The polyalkylene ether polyol may be one or more selected from the group consisting of polytetramethylene ether glycol, poly(oxytetramethylene)ether glycol, poly(oxytetraethylene)ether glycol, poly(oxy-1,2-propylene)ether glycol, and poly(oxy-1,2-butylene)ether glycol.

According to one embodiment of the present invention, the polyisocyanate may have a number average molecular weight of approximately 500 to approximately 50,000 g/mol. In addition, the type of the polyisocyanate is not particularly limited, but is preferably a polymer polymerized from aliphatic and aromatic isocyanates. More specific examples of the aliphatic diisocyanate may include 1,4-tetramethylene diisocyanate, 1,6-hexamethylene diisocyanate, 1,4-cyclohexyl diisocyanate, isophorone diisocyanate, or α,α-xylylene diisocyanate. Examples of the aromatic polyisocyanate may include 4,4'-dimethylmethane diisocyanate, 1,3-phenylene diisocyanate or toluene diisocyanate. In addition, polyisocyanate polymerized from dimers or trimers of the above described diisocyanates may be used.

The above described components included in the thermosetting prepolymer composition are crosslinked with each other by thermosetting to form a thermosetting resin which confers high hardness and processability on the coating layer.

According to one embodiment of the present invention, since the thermosetting resin formed by thermosetting of the thermosetting prepolymer composition, in addition to the crosslinked copolymer polymerized by photo-irradiation, may be included, a setting shrinkage or curl phenomenon in which a substrate is rolled up together with the coating layer during photocuring can be prevented. The curling phenomenon is a phenomenon in which the edge or the like of a planar film is curvilinearly warped or rolled up when the planar film is spread on a flat plate, and this curling phenomenon occurs when acrylate is contracted during photocuring by ultraviolet irradiation.

The plastic film must be improved in surface hardness to a degree high enough to substitute for glass. Basically, the coating layer is required to have a predetermined thickness, in order to improve hardness of the plastic film. However, a thicker coating layer is more prone to setting shrinkage which leads to increased curling and decreased adhesiveness, and rolling up of the plastic film. In this regard, a planarization process of the support substrate may be additionally employed. Undesirably, the coating layer is likely to crack during planarization. Accordingly, it is difficult to prepare a plastic film which is high enough in hardness to substitute for glass, without a decrease in physical properties of the film.

According to one embodiment of the present invention, the presence of the thermosetting resin in addition to the crosslinked copolymer allows the plastic film to maintain high hardness and to prevent photocuring-induced curling. In addition, toughness of the film is improved to increase processability thereof. Hence, physical properties of the plastic film can be further reinforced.

According to one embodiment of the present invention, the thermosetting prepolymer composition may further include a catalyst for promoting a thermosetting reaction. So long as it is known to promote the condensation of the thermosetting prepolymer composition, any catalyst may be available without limitations thereto. In detail, the catalyst may be one or more selected from the group consisting of dibutyltindilaurate (DBTDL), zinc octoate, iron acetyl acetonate, N,N-dimethyl ethanolamine, and triethylene diamine. These catalysts may be used alone or in combination of two or more thereof.

According to one embodiment of the present invention, the crosslinked copolymer and the thermosetting resin may be included at a weight ratio of approximately 1:0.01 to approximately 1:3, or approximately 1:0.1 to approximately 1:2, or approximately 1:0.1 to approximately 1:1.5, or approximately 1:0.1 to approximately 1:1.2. When the crosslinked copolymer and the thermosetting resin are included in the above range, a plastic film having excellent processability while maintaining high hardness can be provided.

According to one embodiment of the present invention, when the coating layer further include the thermosetting resin, approximately 40 to approximately 80 parts by weight of the crosslinked copolymer, approximately 5 to approximately 50 parts by weight of the thermosetting resin, and approximately 5 to approximately 40 parts by weight of the inorganic fine particle may be included, based on 100 parts by weight of the coating layer. When used in such amounts, the thermosetting resin can endow the plastic film with good physical properties such as high hardness and high processability.

When the coating layer of the plastic film of the present invention further includes the thermosetting resin in addition to the crosslinked copolymer, they may form an interpenetrating polymer network (IPN) structure.

As used herein, the 'IPN structure' means the co-existence of two or more crosslinked structures within the coating layer, as exemplified by the first crosslinked structure constructed by the photocuring of the tri- to hexafunctional acrylate-based monomer and the caprolactone group-containing multifunctional acrylate-based compound and the additional second crosslinked structure constructed by the thermosetting of the thermosetting prepolymer composition, respectively. Therefore, the plastic film of the present invention may have an IPN structure in which two or more crosslinked structures are entangled with each other within the coating layer.

According to the present invention, the IPN structure may be constructed by subjecting a coating composition containing both a photocurable monomer and a thermosetting prepolymer composition to photocuring and thermosetting reactions. That is, photocuring and thermosetting are conducted on the coating composition sequentially or simultaneously to allow the photocured and thermoset products to be crosslinked to each other. Hence, the coating layer of the present invention contains an IPN structure including both a first crosslinked structure induced by photocuring the tri- to hexafunctional acrylate-based monomer and the caprolactone group-containing multifunctional acrylate-based compound; and a second crosslinked structure induced by thermosetting the thermosetting prepolymer composition.

According to one embodiment of the present invention, the coating layer may be applied to a thickness of 50 μm or more, for example, approximately 50 to approximately 300 μm, or approximately 50 to approximately 200 μm, or approximately 50 to approximately 150 μm, or approximately 70 to approximately 150 μm.

Meanwhile, the coating layer may further include an additive typically used in the art to which the present invention pertains, such as a surfactant, a yellowing inhibitor, a leveling agent, an antifouling agent or the like, in addition to the above described crosslinked copolymer, thermosetting resin and inorganic fine particle. Here, its content may be variously adjusted to the degree that the physical properties of the plastic film of the present invention are not degraded. Its content is not particularly limited, but, for example, ranges from approximately 0.1 to approximately 10 parts by weight, based on 100 parts by weight of the coating layer.

According to one embodiment of the present invention, for example, the coating layer may include a surfactant as an additive. The surfactant may be a mono- or bi-functional fluorine acrylate, a fluorine surfactant, or a silicon surfactant. In this regard, the surfactant may be contained in a dispersed or crosslinked form in the crosslinked copolymer. Further, a yellowing inhibitor may be included as an additive. The yellowing inhibitor may be a benzophenone compound, a benzotriazole compound or the like.

The coating layer may be formed by applying the coating composition including the tri- to hexafunctional acrylate-based monomer, the caprolactone group-containing multifunctional acrylate-based compound, a photoinitiator, the inorganic fine particle, an organic solvent, and optionally, the thermosetting prepolymer composition, an additive, etc. onto the support substrate, and then photocuring it.

The photoinitiator may be exemplified by 1-hydroxycyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, or bis(2,4,6-trimethylbenzoyl)-phenylphosphine oxide, but is not limited thereto. In addition, it may be commercially available under the trade name of, for example, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, etc. These photoinitiators may be used alone or in combination of two or more thereof.

The organic solvent may be an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methylethylketone, methylisobutyl ketone, methylpropyl ketone, and cyclohexanone; an ether solvent such as propylene glycol monopropylether, propyleneglycol monomethyl ether, ethylene glycol monethylether, ethyleneglycol monopropylether, ethyleneglycolmonobutylether, diethyleneglycolmonomethylether, diethylglycolmonoethyl ether, diethylglycolmonopropylether, diethylglycolmonobutylether, diethyleneglycol-2-ethylhexyl ether; an aromatic solvent such as benzene, toluene, and xylene; and they may be used alone or in combination thereof.

In the coating composition, the organic solvent may be used in such an amount that the weight ratio of the solid component to the organic solvent ranges from approximately 70:30 to approximately 99:1, based on the solid component including the tri- to hexafunctional acrylate-based monomer, the caprolactone group-containing multifunctional acrylate-based compound, the photoinitiator, the inorganic fine particle, the thermosetting prepolymer composition, and other additive.

According to one embodiment of the present invention, the coating layer may be formed only on one side of the support substrate.

According to another embodiment of the present invention, the coating layer may be formed on both sides of the support substrate.

When the coating layer is formed on both sides of the support substrate, the coating composition may be applied onto the front and back sides of the support substrate and cured in a sequential or simultaneous manner. At this time, after application of the coating composition, a process of drying the coating composition at a predetermined temperature may be further carried out, in order to evaporate the solvent and to form a planar film.

According to one embodiment of the present invention, the coating composition including the above described components is applied onto one side of the support substrate, and then photocured to form the first coating layer.

When the first coating layer is formed using the first coating composition, a typical method used in the art to which the present invention pertains may be used. For example, the first coating composition including the above described components is first applied onto one side of the support substrate. At this time, the method of applying the first coating composition is not particularly limited, so long as it is used in the art to which the present invention pertains. For example, bar coating, knife coating, roll coating, blade coating, die coating, micro-gravure coating, comma coating, slot die coating, lip coating, solution casting or the like may be used.

Next, the first coating composition thus applied is photocured with UV radiation to form the first coating layer.

The UV radiation may be emitted, for example, at a dose of approximately 20 to approximately 600 $mJ/cm^2$, or approximately 50 to approximately 500 $mJ/cm^2$. The light source of UV radiation is not particularly limited, so long as it is used in the art to which the present invention pertains. For example, a high-pressure mercury lamp, a metal halide lamp, a black light fluorescent lamp or the like may be used. The photocuring step may be carried out by irradiating UV light at the above dose for approximately 30 seconds to approximately 15 minutes, or for approximately 1 minute to approximately 10 minutes.

After completely cured, the first coating layer may have a thickness of approximately 50 to approximately 300 μm, or approximately 50 to approximately 200 μm, or approximately 50 to approximately 150 μm, or approximately 70 to approximately 150 μm.

In this regard, according to one embodiment of the present invention, the first coating composition applied onto one side of the support substrate may be not completely cured at one time, but partially cured to the degree that the photocurable functional groups of the tri- to hexafunctional acrylate-based monomer and the caprolactone group-containing multifunctional acrylate-based compound contained in the first coating composition are partially cured, for example, by approximately 30 to 60 mol %, or by approximately 40 to 50 mol %. Therefore, the setting shrinkage of the first coating composition is further reduced, conferring excellent physical and optical properties as well as high hardness on the plastic film without generating curls or cracks. Then, in the after-mentioned step of curing the second coating composition applied onto the back side of the supporting substrate, the remaining first coating composition is cured, and thus, the curl which is generated in the step of curing the first coating composition is counterbalanced to afford a flat plastic film.

Next, the second coating composition including the above described components is applied onto the other side, that is, the back side of the support substrate. In this regard, the first and the second coating compositions are the same as the above described coating composition and are just terminologically discriminated for application to opposite respective sides of the substrate.

Next, the second coating composition thus applied is photocured by UV irradiation to form a second coating layer. In this regard, in the step of photocuring the second coating composition, UV light is irradiated to a surface opposite to that coated with the first coating composition. Thus, the curl which may be generated by setting shrinkage of the first coating composition is counterbalanced to afford a flat plastic film. No additional flattening processes are thus needed.

The UV radiation may be emitted, for example, at a dose of approximately 20 to approximately 600 mJ/cm$^2$, or approximately 50 to approximately 500 mJ/cm$^2$. The light source of UV radiation is not particularly limited, so long as it is used in the art to which the present invention pertains. For example, a high-pressure mercury lamp, a metal halide lamp, a black light fluorescent lamp or the like may be used. The photocuring step may be carried out with the above dose for approximately 30 seconds to approximately 15 minutes, or for approximately 1 minute to approximately 10 minutes.

After completely cured, the second coating layer may have a thickness of approximately 50 to approximately 300 μm, or approximately 50 to approximately 200 μm, or approximately 50 to approximately 150 μm, or approximately 70 to approximately 150 μm.

According to one embodiment of the present invention, if the coating composition further includes the thermosetting prepolymer composition, the coating layer is formed by photocuring and thermosetting. More specifically, the first coating composition is first applied onto one side of the support substrate and photocured, and then thermoset by heating it to a predetermined temperature, after which a second coating composition is subsequently applied to the other side, that is, the back side of the substrate, and photocured, and then thermoset by heating it to a predetermined temperature. In this regard, the first and the second coating compositions are the same as the above described coating composition and are just terminologically discriminated for application to opposite respective sides of the substrate. With regard to the order of photocuring and thermosetting, the thermosetting may be first carried out, followed by photocuring, or the photocuring may be first carried out, followed by thermosetting. Preferably, the photocuring is first carried out, followed by thermosetting to form a high-hardness plastic film with higher processability.

As the thickness of the coating layer is increased, UV light does not sufficiently reach the bottom of the coating layer, causing a problem of incomplete curing of the coating layer. According to the present invention, the curing of the thermosetting prepolymer composition under both heat and UV can compensate for the insufficient photocuring which might occur, thereby reinforcing the hardness and physical properties of the coating layer. In addition, the IPN structure including the first crosslinked structure constructed by photocuring and the additional second crosslinked structure constructed by thermosetting the thermosetting prepolymer composition guarantees that the film has both high hardness and processability.

The thermosetting for curing the thermosetting prepolymer composition may be optionally carried out once or more times before and/or after UV irradiation for photocuring. The thermosetting may be achieved by heating at approximately 60 to approximately 140° C., at approximately 80 to approximately 130° C., or at approximately 80 to approximately 120° C. for approximately 1 minute to approximately 1 hour, or for approximately 2 minutes to approximately 30 minutes.

For use as a cover for mobile terminals or tablet PCs, it is important that the plastic film must have hardness or impact resistance elevated sufficiently to be a substitute for glass. Even when formed at a high thickness on the substrate, the coating layer according to the present invention is less prone to curling or cracking, and imparts the plastic film with high transparency, impact resistance, and self-healing capability.

The plastic film according to the present invention exhibits excellent high hardness, scratch resistance, self-healing capability, high transparency, durability, light resistance, light transmittance or the like.

The plastic film of the present invention exhibits superiority in terms of impact resistance, so that it can be used as a substitute for glass. For example, the plastic film of the present invention may not crack even after a steel bead weighing 22 g is freely dropped ten times from a height of 50 cm thereto.

Further, the plastic film of the present invention may have a pencil hardness of 6H or more, 7H or more, or 8H or more under a load of 1 kg.

Further, the plastic film of the present invention exhibits self-healing capability for recovery of the surface of the coating layer within 30 seconds or 25 seconds after being rubbed with a copper brush.

Further, the plastic film of the present invention may have a light transmittance of 92% or more, and a haze of 1.0% or less, 0.5% or less, or 0.4% or less.

Furthermore, the plastic film of the present invention may have an initial color b* (b* defined by the CIE 1976 L*a*b* color space) of 1.0 or less. After the coating film is exposed to UVB under an ultraviolet lamp for 72 hours or more, it may have a color b* value which differs from the pre-exposed color b* value by 0.5 or less, or by 0.4 or less.

Further, when the plastic film of the present invention is disposed on a plane after exposure to a temperature of 50° C. or higher at a humidity of 80% or higher for 70 hours, the maximum distance at which each edge or side of the plastic film is spaced apart from the plane may be approximately 1.0 mm or less, approximately 0.6 mm or less, or approximately 0.3 mm or less. More particularly, when the plastic film is disposed on a plane after exposure to a temperature of 50° C. to 90° C. at a humidity of 80% to 90% for 70 to 100 hrs, each edge or side of the plastic film is spaced apart from the plane by approximately 1.0 mm or less, approximately 0.6 mm or less, or approximately 0.3 mm or less, maximally.

Further, when the coating composition of the present invention further includes the thermosetting prepolymer composition, and a support substrate piece with dimensions of 10 cm×10 cm, obtained by applying the coating composition to one side of the support substrate, and curing under light and heat, is placed on a flat plane, a maximal distance at which each edge or side is apart from the plane may be 3 cm or less, or 2.5 cm or less, or 2.0 cm or less.

As described above, the plastic film of the present invention exhibits high hardness, impact resistance, self-healing property, scratch resistance, high transparency, durability, light resistance, high light transmittance or the like, and thus can be applied to various fields. For example, the plastic film of the present invention can be used in touch panels of mobile terminals, smart phones or tablet PCs, and cover or device panels of various displays as an alternative to a cover plate made of glass or reinforced glass.

Hereinafter, the actions and effects of the present invention will be described in more detail with reference to the specific examples. However, these examples are for illustrative purposes only, and the scope of the invention is not intended to be limited by these examples.

EXAMPLE

Preparation Example 1: Preparation of Caprolactone Group-Containing Multifunctional Acrylate-Based Compound 50 g of a caprolactone-grafted polyrotaxane polymer [A1000, Advanced Soft Material Inc.] was introduced into a reactor, and then 4.53 g of Karenz-AOI [2-acryloylethyl isocyanate, Showadenko K.K.], 20 mg of dibutyltin dilaurate [DBTDL, Merck & Co, Inc.], 110 mg of hydroquinone monomethylene ether, and 315 g of methylethylketone were added thereto and allowed to react at 70° C. for 5 hours, so as to obtain a polyrotaxane polymer containing cyclodextrin, to which a polycaprolactone group having an acrylate-based compound at the end binds, as a macrocycle.

The polyrotaxane polymer thus obtained had a weight average molecular weight of 600,000 g/mol and an elongation of 20% as measured according to ASTM D638.

Preparation Example 2: Preparation of Thermosetting Prepolymer Composition

To a jacket reactor were placed 50 g of methylethyl ketone and 50 g of cyclohexanone, and then 70 g of polyurethane Estane 5701® (Noveon, polyurethane containing Bronsted salt, number average molecular weight of 40,000), followed by stirring for 2 hours at 80° C.

Afterward, 14 g of polytetramethyleneetherglycol (Terathane 1000®, Mw=1000, Sigma Aldrich), 1.5 g of 1,4-butanediol, and 17 g of a polyester polyol resin (dispersed in n-butyl acetate, Desmophen 670BA®, Bayer) were added to the reactor, and stirred at room temperature for 30 minutes. Subsequently, 124 g of a cyclic polyisocyanate (blocked with MEKO, Vestant B 1358A®, Degusa), 0.3 g of dibutyltin dilaurate (DBTDL), and 1.2 g of Tego 410® and 1.2 g of Tego 450® as additives, which are both fluidity improvers, were introduced into the reactor, followed by stirring to the homogeneity to afford a thermosetting prepolymer composition with 70% of the solid content including the polyester-based polyurethane oligomer, polyol and polyisocyanate.

Example 1

A coating composition was prepared by mixing 9 g of silica-dipentaerythritol hexaacrylate (DPHA) composite in which 40% by weight of nano-silica with a diameter of 20~30 nm was dispersed (3.6 g of silica, 5.4 g of DPHA), 1.4 g of polyrotaxane of Preparation Example 1, 0.2 g of a photoinitiator (brand name: Darocur TPO), 0.1 g of a benzotriazole yellowing inhibitor (brand name: Tinuvin 400), and 0.05 g of a fluorine surfactant (brand name: FC4430) and 1 g of methylethylketone.

The coating composition was applied to a PET support substrate with a size of 15 cm×20 cm and a thickness of 188 μm, followed by subjecting the composition to photocuring by irradiating UV light of 280~350 nm using a black light fluorescent lamp so as to form a first coating layer.

The coating composition was applied to the back side of the support substrate, followed by subjecting the composition to photocuring by irradiating UV light of 280~350 nm using the black light fluorescent lamp so as to form a second coating layer. Thus, a plastic film was fabricated. After completion of the curing, each of the first and second coating layers formed on both sides of the substrate had a thickness of 100 μm.

Example 2

A plastic film was fabricated in the same manner as in Example 1, except that 2 g of the polyrotaxane of Preparation Example 1 was used instead of 1.4 g thereof in Example 1.

Example 3

A plastic film was fabricated in the same manner as in Example 1, except that 9 g of silica-trimethylolpropane triacrylate (TMPTA) composite in which 40% by weight of nano-silica with a diameter of 20~30 nm was dispersed (3.6 g of silica, 5.4 g of TMPTA) was used instead of 9 g of the silica-DPHA composite in Example 1.

Example 4

A first coating composition was prepared by mixing 2.0 g of the thermosetting prepolymer composition of Preparation Example 2, 9 g of silica-dipentaerythritol hexaacrylate (DPHA) composite in which 40% by weight of nano-silica with a diameter of 20~30 nm was dispersed (3.6 g of silica, 5.4 g of DPHA), 1.4 g of polyrotaxane of Preparation Example 1, 0.2 g of a photoinitiator (brand name: Darocur TPO), 0.1 g of a benzotriazole yellowing inhibitor (brand name: Tinuvin 400), and 0.05 g of a fluorine surfactant (brand name: FC4430). A second coating composition was also prepared in the same manner.

The first coating composition was applied to a PET support substrate with a size of 15 cm×20 cm and a thickness of 188 μm, followed by subjecting the composition to photocuring by irradiating UV light of 280~350 nm using a black light fluorescent lamp and then to thermosetting at 130° C. for 30 minutes to form a first coating layer.

The second coating composition was applied to the back side of the support substrate, followed by subjecting the composition to photocuring by irradiating UV light of 280~350 nm using the black light fluorescent lamp and then to thermosetting at 130° C. for 30 minutes to form a second coating layer. After completion of the curing, each of the first and second coating layers formed on both sides of the substrate had a thickness of 100 μm.

Example 5

A plastic film was fabricated in the same manner as in Example 4, except that 3.6 g of the thermosetting prepolymer composition of Preparation Example 2 was used instead of 2.0 g thereof in Example 4.

Example 6

A plastic film was fabricated in the same manner as in Example 4, except that 9 g of silica-trimethylolpropane triacrylate (TMPTA) composite in which 40% by weight of nano-silica with a diameter of 20~30 nm was dispersed (3.6 g of silica, 5.4 g of TMPTA) was used instead of 9 g of the silica-DPHA composite in Example 4.

Example 7

A plastic film was fabricated in the same manner as in Example 4, except that 2 g of the polyrotaxane of Preparation Example 1 was used instead of 1.4 g thereof in Example 4.

Example 8

A plastic film was fabricated in the same manner as in Example 4, except that 9.0 g of the thermosetting prepolymer composition of Preparation Example 2 was used instead of 2.0 g thereof in Example 4.

Comparative Example 1

A plastic film was fabricated in the same manner as in Example 1, except that 10 g of the silica-DPHA composite was used (4 g of silica, 6 g of DPHA) instead of 9 g of silica-DPHA composite and the polyrotaxane of Preparation Example 1 was not used in Example 1.

Comparative Example 2

A plastic film was fabricated in the same manner as in Example 1, except that 1.0 g of the polyrotaxane of Preparation Example 1 was used instead of 1.4 g thereof in Example 1.

Comparative Example 3

A plastic film was fabricated in the same manner as in Example 4, except that 10 g of the DPHA composite was used (4 g of silica, 6 g of DPHA) instead of 9 g of silica-DPHA composite and the polyrotaxane of Preparation Example 1 was not used in Example 4.

Comparative Example 4

A plastic film was fabricated in the same manner as in Example 4, except that 1.0 g of the polyrotaxane of Preparation Example 1 was used instead of 1.4 g thereof in Example 4.

Main components of the compositions used in Examples 1 to 8 and Comparative Examples 1 to 4 are summarized in Table 1, below.

TABLE 1

| | Type and content of tri- to hexafunctional acrylate-based monomer (unit: g) | Caprolactone group-containing multifunctional acrylate-based compound (unit: g) | Silica (unit: g) | Thermosetting prepolymer composition (unit: g) |
|---|---|---|---|---|
| Example 1 | DPHA, 5.4 | 1.4 | 3.6 | — |
| Example 2 | DPHA, 5.4 | 2 | 3.6 | — |
| Example 3 | TMPTA, 5.4 | 1.4 | 3.6 | — |
| Example 4 | DPHA, 5.4 | 1.4 | 3.6 | 2.0 (solid content: approximately 1.4 g) |
| Example 5 | DPHA, 5.4 | 1.4 | 3.6 | 3.6 (solid content: approximately 2.5 g) |
| Example 6 | TMPTA, 5.4 | 1.4 | 3.6 | 2.0 (solid content: approximately 1.4 g) |
| Example 7 | DPHA, 5.4 | 2 | 3.6 | 2.0 (solid content: approximately 1.4 g) |
| Example 8 | DPHA, 5.4 | 1.4 | 3.6 | 9.0 (solid content: approximately 6.3 g) |
| Comparative Example 1 | DPHA, 6 | — | 4 | |
| Comparative Example 2 | DPHA, 5.4 | 1.0 | 3.6 | |
| Comparative Example 3 | DPHA, 6 | — | 4 | 2.0 (solid content: 1.4 g) |
| Comparative Example 4 | DPHA, 5.4 | 1.0 | 3.6 | 2.0 (solid content: approximately 1.4 g) |

Experimental Example

<Measurement Methods>

1) Pencil Hardness

Hardness was measured using a pencil hardness tester under a load of 1.0 kg according to Measurement Standard JIS K5400 three times, and then the hardness at which no scratches appeared was determined.

2) Self-Healing Capability

A time to recover from a scratch after rubbing the surface of a coating layer with a copper brush under a load of 1 kg once was measured.

3) Light Resistance

Differences in color b* value were measured before and after exposure to UVB in a UV lamp for 72 hours or longer.

4) Transmittance and Haze

Transmittance and haze were measured using a spectrophotometer (brand name: COH-400).

5) Curl Property

After the formation of the first coating layer, the film was cut into a piece with dimensions of 10 cm×10 cm and placed on a flat plane. A maximal distance at which each edge or side was apart from the plane was measured.

6) Cylindrical Bending Test

Each of the plastic films was wound on a cylindrical mandrel having a diameter of 3 cm, and cracking occurrence was examined. When the plastic film was not cracked, it was evaluated as OK. If the plastic film was cracked, it was evaluated as X.

7) Impact Resistance

The impact resistance of each of the plastic films was evaluated by determining whether each of the plastic films was cracked when 22 g of a steel ball was dropped 10 times thereon from a height of 50 cm. Each of the plastic films was evaluated as OK when it was not cracked, and as X when cracked.

The results of measuring the physical properties are summarized in Tables 2 and 3, below.

TABLE 2

|  | Example 1 | Example 2 | Example 3 | Example 4 | Example 5 | Example 6 | Example 7 | Example 8 |
|---|---|---|---|---|---|---|---|---|
| Pencil hardness | 7H | 6H | 6H | 8H | 6H | 6H | 6H | 6H |
| Self-healing capability | 25 sec | 10 sec | 25 sec | 25 sec | 20 sec | 25 sec | 15 sec | 20 sec |
| Light resistance | 0.20 | 0.24 | 0.15 | 0.21 | 0.23 | 0.18 | 0.28 | 0.16 |
| Transmittance | 92.1 | 91.9 | 92.3 | 92.3 | 92.0 | 91.9 | 92.0 | 92.5 |
| Haze | 0.3 | 0.2 | 0.3 | 0.3 | 0.2 | 0.3 | 0.4 | 0.4 |
| Bending test | OK | OK | OK | OK | OK | OK | OK | OK |
| Curl property | 0.3 mm | 0.4 mm | 0.2 mm | 0.3 mm | 0.4 mm | 0.3 mm | 0.2 mm | 0.1 mm |
| Impact resistance | OK | OK | OK | OK | OK | OK | OK | OK |

TABLE 3

|  | Comparative Example 1 | Comparative Example 2 | Comparative Example 3 | Comparative Example 4 |
|---|---|---|---|---|
| Pencil hardness | 9H | 8H | 8H | 6H |
| Self-healing capability | No recovery | 2 min | No recovery | 2 min |
| Light resistance | 0.35 | 0.38 | 0.25 | 0.25 |
| Transmittance | 92.0 | 92.1 | 92.1 | 92.3 |
| Haze | 0.4 | 0.3 | 0.2 | 0.3 |
| Bending test | X | OK | OK | OK |
| Curl property | 0.5 mm | 0.4 mm | 0.3 mm | 0.2 mm |
| Impact resistance | X | OK | X | OK |

As shown in Tables 2 and 3 above, all of the plastic films of Examples 1 to 8 of the present invention were found to have good physical properties, particularly, to exhibit self-healing capability for recovery of the surface within 30 seconds after being rubbed with a copper brush.

What is claimed is:

1. A plastic film, comprising:
   a support substrate; and
   a coating layer formed on at least one side of the support substrate, wherein the coating layer includes: (i) a crosslinked copolymer, in which a tri- to hexafunctional acrylate-based monomer and a caprolactone group-containing multifunctional acrylate-based compound are copolymerized at a weight ratio of 5:5 to 8:2, and (ii) an inorganic fine particle, which is dispersed in the crosslinked copolymer,
   wherein the caprolactone group-containing multifunctional acrylate-based compound is polyrotaxane.

2. The plastic film of claim 1, wherein the polyrotaxane includes a macrocycle, to which a caprolactone group having an acrylate-based compound introduced at the end thereof binds; a linear molecule penetrating the macrocycle; and blocking groups arranged at both ends of the linear molecule to prevent the macrocycle from escaping.

3. The plastic film of claim 2, wherein the macrocycle includes one or more selected from the group consisting of α-cyclodextrin, β-cyclodextrin, and γ-cyclodextrin, and wherein the linear molecule is a polyoxyalkylene compound or a polycaprolactone group.

4. The plastic film of claim 2, wherein the blocking group includes one or more functional groups selected from the group consisting of dinitrophenyl, cyclodextrin, adamantane, trityl, fluorescein, and pyrene groups.

5. The plastic film of claim 1, comprising 50 to 90 parts by weight of the crosslinked copolymer and 10 to 50 parts by weight of the inorganic fine particle when the total weight of the coating layer is regarded as 100 parts by weight.

6. The plastic film of claim 1, wherein the coating layer further includes a thermosetting resin.

7. The plastic film of claim 6, wherein the thermosetting resin is a thermoset product of a prepolymer composition including a polyester-based polyurethane oligomer, a polyol, and a polyisocyanate.

8. The plastic film of claim 7, comprising 10 to 40% by weight of the polyester-based polyurethane oligomer, 5 to 30% by weight of the polyol, and 50 to 80% by weight of the polyisocyanate, based on the total weight of the thermosetting prepolymer composition.

9. The plastic film of claim 7, wherein the polyol includes one or more selected from the group consisting of polyethylene glycol polyol, polycarprolactone polyol, polyester polyol, polyether polyol, polyacryl polyol, and polycarbonate polyoldiol.

10. The plastic film of claim 7, wherein the polyisocyanate is one or more selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-dimethylmethane diisocyante, 1,3-phenylene diisocyanate, and toluene diisocyanate, or polyisocyanate polymerized from dimers or trimers thereof.

11. The plastic film of claim 6, comprising the crosslinked copolymer and the thermosetting resin at a weight ratio of 1:0.01 to 1:3.

12. The plastic film of claim 6, comprising 40 to 80 parts by weight of the crosslinked copolymer, 5 to 50 parts by weight of the thermosetting resin, and 5 to 40 parts by weight of the inorganic fine particle, based on 100 parts by weight of the coating layer.

13. The plastic film of claim 1, wherein the tri- to hexafunctional acrylate-based monomer includes one or more selected from the group consisting of trimethylolpropane triacrylate (TMPTA), trimethylolpropane ethoxy triacrylate (TMPEOTA), glycerin-propoxylated triacrylate (GPTA), pentaerythritol tetraacrylate (PETA), and dipentaerythritol hexaacrylate (DPHA).

14. The plastic film of claim 1, wherein the thickness of the coating layer is 50 to 300 μm.

15. The plastic film of claim 1, wherein the plastic film does not crack even after a steel bead weighing 22 g is freely dropped ten times from a height of 50 cm thereto.

16. The plastic film of claim 1, wherein the coating layer has a pencil hardness of 6H or more under a load of 1 kg.

17. The plastic film of claim 1, wherein the plastic film has self-healing capability.

* * * * *